United States Patent

Howard

[11] Patent Number: 6,127,923
[45] Date of Patent: *Oct. 3, 2000

[54] ANTITHEFT ALARM SYSTEM FOR A CAR HAVING A CAR STEREO

[75] Inventor: Damian Howard, Saitama-ken, Japan

[73] Assignee: Pioneer Electronics Corporation, Tokyo, Japan

[*] Notice: This patent is subject to a terminal disclaimer.

[21] Appl. No.: 09/204,170

[22] Filed: Dec. 3, 1998

Related U.S. Application Data

[62] Division of application No. 08/831,748, Apr. 1, 1997, Pat. No. 5,880,673.

[30] Foreign Application Priority Data

Apr. 2, 1996 [JP] Japan ..................................... 8-080347

[51] Int. Cl.$^7$ .................................................. B60R 25/10
[52] U.S. Cl. ......................... 340/426; 340/689; 307/10.2; 307/10.3; 180/287
[58] Field of Search ..................................... 340/426, 428, 340/429, 430, 689; 307/10.2, 10.3, 10.4, 10.5; 180/287

[56] References Cited

U.S. PATENT DOCUMENTS

| | | | |
|---|---|---|---|
| 4,291,237 | 9/1981 | Kitano | 180/287 |
| 4,565,010 | 1/1986 | Herman | 340/689 |
| 4,638,293 | 1/1987 | Min | 340/426 |
| 4,720,700 | 1/1988 | Seibold et al. | 340/568 |
| 4,743,894 | 5/1988 | Bochmann | 340/691 |
| 4,887,065 | 12/1989 | Robitschko et al. | 340/430 |
| 4,980,666 | 12/1990 | Hwang | 340/426 |
| 4,983,947 | 1/1991 | Mullen et al. | 340/426 |
| 4,985,694 | 1/1991 | Sunami | 340/426 |
| 5,157,375 | 10/1992 | Drori | 340/426 |
| 5,349,326 | 9/1994 | Yamada | 340/426 |
| 5,381,128 | 1/1995 | Kaplan | 340/426 |
| 5,394,135 | 2/1995 | Stadler | 340/426 |
| 5,451,925 | 9/1995 | Le | 340/426 |
| 5,506,563 | 4/1996 | Jonic | 340/426 |
| 5,554,966 | 9/1996 | Iijima et al. | 340/426 |
| 5,559,491 | 9/1996 | Stadler | 340/426 |
| 5,635,900 | 6/1997 | Hasegawa et al. | 340/426 |
| 5,670,933 | 9/1997 | Hayashi | 340/426 |
| 5,673,017 | 9/1997 | Dery et al. | 340/426 |
| 5,705,976 | 1/1998 | Howard | 340/426 |

FOREIGN PATENT DOCUMENTS

| | | |
|---|---|---|
| 0 358 544 | 3/1990 | European Pat. Off. . |
| 0 767 087 | 4/1997 | European Pat. Off. . |
| 28 18 488 | 11/1978 | Germany . |
| 28 22 408 | 12/1979 | Germany . |
| 41 32 523 | 1/1993 | Germany . |
| 42 40 458 | 12/1993 | Germany . |
| 42 44 468 | 7/1994 | Germany . |
| 43 14 064 | 11/1994 | Germany . |
| 43 20 188 | 12/1994 | Germany . |
| 43 21 509 | 1/1995 | Germany . |
| 43 33 014 | 1/1995 | Germany . |
| 296 00 694 U | 5/1996 | Germany . |
| 19713655 | 4/1997 | Germany . |
| 7-168019 | 7/1995 | Japan . |
| 8-339484 | 12/1996 | Japan . |

*Primary Examiner*—Nina Tong
*Attorney, Agent, or Firm*—Arent Fox Kintner Plotkin & Kahn, PLLC

[57] ABSTRACT

An alarm device is provided in a car. A criminal act such as braking of a window of the car is detected and a criminal act signal is produced. In accordance with the criminal act signal, the alarm device is operated. When an ignition switch of the car is operated by an ignition key within a first predetermined time after opening of a door of the car, the production of the criminal act signal is stopped.

18 Claims, 12 Drawing Sheets

ANTITHEFT ALARM SYSTEM FOR A CAR HAVING A CAR STEREO

This is a divisional application of Ser. No. 08/831,748 filed Apr. 1, 1997, now is patented as U.S. Pat. No. 5,880,673.

BACKGROUND OF THE INVENTION

The present invention relates to an improved antitheft alarm system for a car and an electronic device mounted in the car.

In order to prevent a theft of a car stereo and other electronic devices provided in the car, there has been made many proposals. In accordance with one of the proposals, a removable panel having a plurality of push button, keys and a display for controlling the stereo is attached to the body of the stereo. When the removable panel is attached to the body, a circuit provided therein is electrically connected to a circuit in the body, thereby enabling the car stereo to operate. The body is totally useless unless the panel is attached. Hence, if the driver takes the panel with him when leaving the car, the theft of the car stereo can be prevented.

In accordance with another proposed system, a car stereo is provided with means for registering an identification code. The user, when leaving the car, stores an arbitrary code in a memory provided in the car stereo by operating a ten-key keyboard which is used for designating songs to be played on the car stereo. If the car stereo is stolen from the car, a control unit provided in the car stereo determines that the car stereo is disconnected from a power supply. When the car stereo is again applied with power, the car stereo cannot be operated unless the code is input.

Some cars are provided with antitheft systems for preventing the theft of the car. The system is operatively connected to a door of the car. When the door is opened by a means other than a key of the owner, the car horn emits an alarming sound.

In order to prevent the theft of both the car stereo and the car itself, a system for each must be provided. Thus the antitheft systems become complicated and also the cost is increased. In addition, the systems takes up a space in the interior of the car. Moreover, the driver must carry out complicated operations to set and release the alarm which takes time. There is a further possibility of the driver forgetting the procedure for operating one of these systems.

The applicant of the present invention has disclosed in Japanese Patent Application No. 7-168019, an antitheft alarm system of a car and a car stereo mounted in the car, wherein the alarm mode is easily set by removing a panel of the car stereo from a body thereof. The alarm is activated unless the panel is attached or when the ignition key is operated within a predetermined time after the door of the car is opened for entry. Since most of the cars are now equipped with a car stereo, the system is quite effective.

The conventional alarm system determines the entry of the legitimate user only when an releasing operation such as the attaching of the panel and turning of the ignition key is carried out within a predetermined period. The legitimate user is often startled by the unexpected sounding of alarm when the releasing operation is forgotten or delayed. In addition, the car stereo cannot be stolen if the intrusion into the car itself is prevented in the first place. Hence it is not necessary to use the detachable panel in the alarm system.

Moreover, the alarm system is ineffective against intrusion without the opening of the door, namely, through windows, and vandalistic criminal act, such as smashing and striking of the car from the outside, which do not necessarily result in the theft of the car.

SUMMARY OF THE INVENTION

An object of the present invention is to provide an antitheft alarm system of a car with a car stereo wherein the alarm can be easily released by the legitimate user of the car, the operation of which do not necessarily accompany the use of a detachable panel of the car stereo.

Another object is to provide a system wherein the car can be further securely protected against theft and vandalism.

According to the present invention, there is provided an antitheft alarm system for a car having a car stereo, comprising, an alarm device provided in the car, first detector means for detecting criminal acts on the car and for producing a criminal act signal, alarm operating means responsive to the criminal act signal for operating the alarm device, second detector means for detecting first operation of an ignition switch of the car by an ignition key within a first predetermined time after opening of a door of the car and for producing a releasing signal, and stopping means responsive to the releasing signal for stopping the production of the criminal act signal.

The criminal act is to open a door of the car over the first predetermined time, or to break a window of the car, or to sway the car.

The alarm device is a horn of the car, or a speaker of the car.

Means is provided for stopping the operation of the alarm operating means after a second predetermined time from the starting of the operation.

The present invention further provides an antitheft alarm system for a car having a car stereo, comprising, an alarm device provided in the car, first detector means for detecting criminal acts on the car and for producing a criminal act signal, alarm operating means responsive to the criminal act signal for operating the alarm device, second detector means for detecting opening of a door of the car by an ignition key and for producing a releasing signal, stopping means responsive to the releasing signal for stopping the production of the criminal act signal.

In another aspect of the present invention, there is provided an antitheft alarm system for a car having a car stereo, comprising, an alarm device provided in the car, first detector means for detecting criminal acts on the car and for producing a criminal act signal, alarm operating means responsive to the criminal act signal for operating the alarm device, second detector means for detecting operation of an ignition key of the car and for producing a releasing signal when the number of the operation of the key exceeds a predetermined number, stopping means responsive to the releasing signal for stopping the production of the criminal act signal.

There is also provided an antitheft alarm system for a car having a car stereo having a removable panel attached to a body of the car stereo, the panel having a plurality of operation buttons for operating the car stereo, comprising, an alarm device provided in the car, first detector means for detecting criminal acts on the car and for producing a criminal act signal, alarm operating means responsive to the criminal act signal for operating the alarm device, second detector means for detecting attaching of the removable panel to the body and for producing a releasing signal, stopping means responsive to the releasing signal for stopping the production of the criminal act signal.

These and other objects and features of the present invention will become more apparent from the following detailed description with reference to the accompanying drawings.

DETAILED DESCRIPTION OF THE PREFERRED EMBODIMENT

Figure 1A:
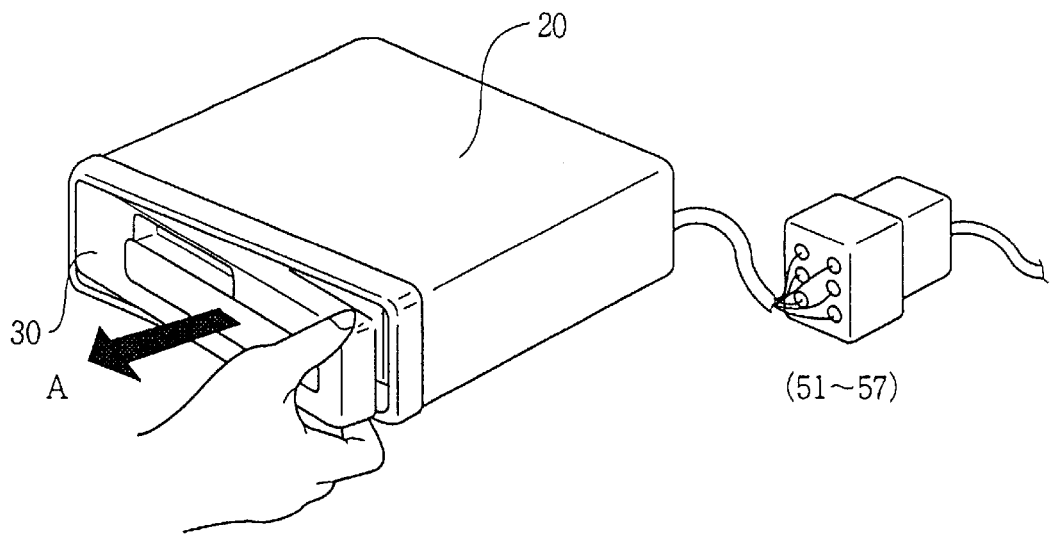
FIGS. 1a and 1b are perspective views of a car stereo to which the present invention is applied, each showing a panel thereof being removed and attached, respectively.
Figure 1B:
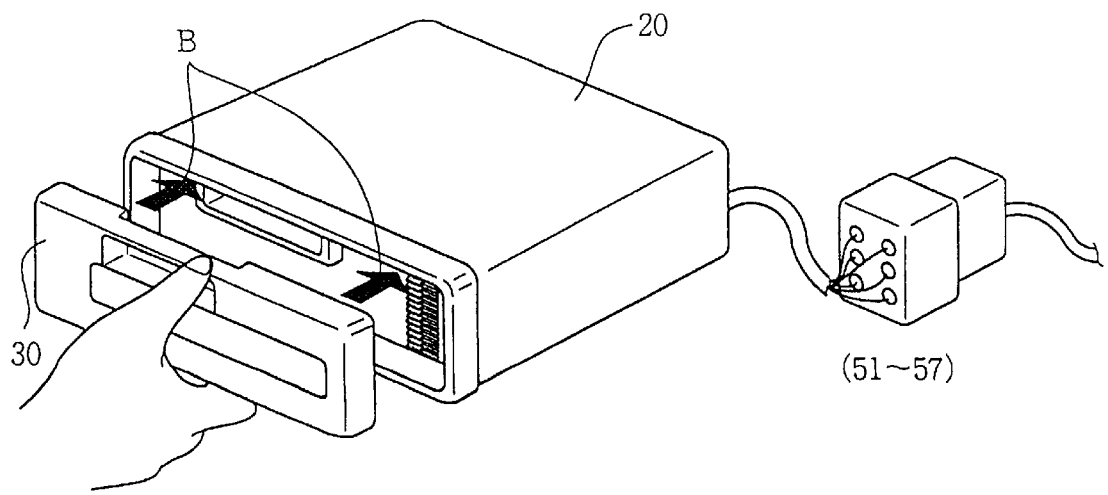

Referring to FIGS. 1a and 1b, a car stereo to which the present invention is applied has a body 20 and a removable panel 30 attached to the body 20. Although not shown in the figure, on the panel are provided a display and plurality of number keys such as from 1 to 20, various cursor control keys marked with arrows in vertical and horizontal directions. The keys are operated to activate a key matrix circuit 31 (FIG. 2) when playing the car stereo. If an electric circuit provided in the panel 30 must be connected to an electric circuit in the body 20, the panel and the body are each provided with respective connectors 32 and 42 (FIG. 2) for connecting the circuits. The electric circuit in the body 20 is further connected with an electric circuit 10 (FIG. 2) provided in a car through a plurality of pin jacks 51 to 57.

As shown in FIG. 1a, the panel 30 is manually pulled in a direction shown by an arrow A to be removed from the body 20, and pushed against the body in a direction shown by an arrow B as shown in FIG. 1b to be attached thereto.

Figure 2:
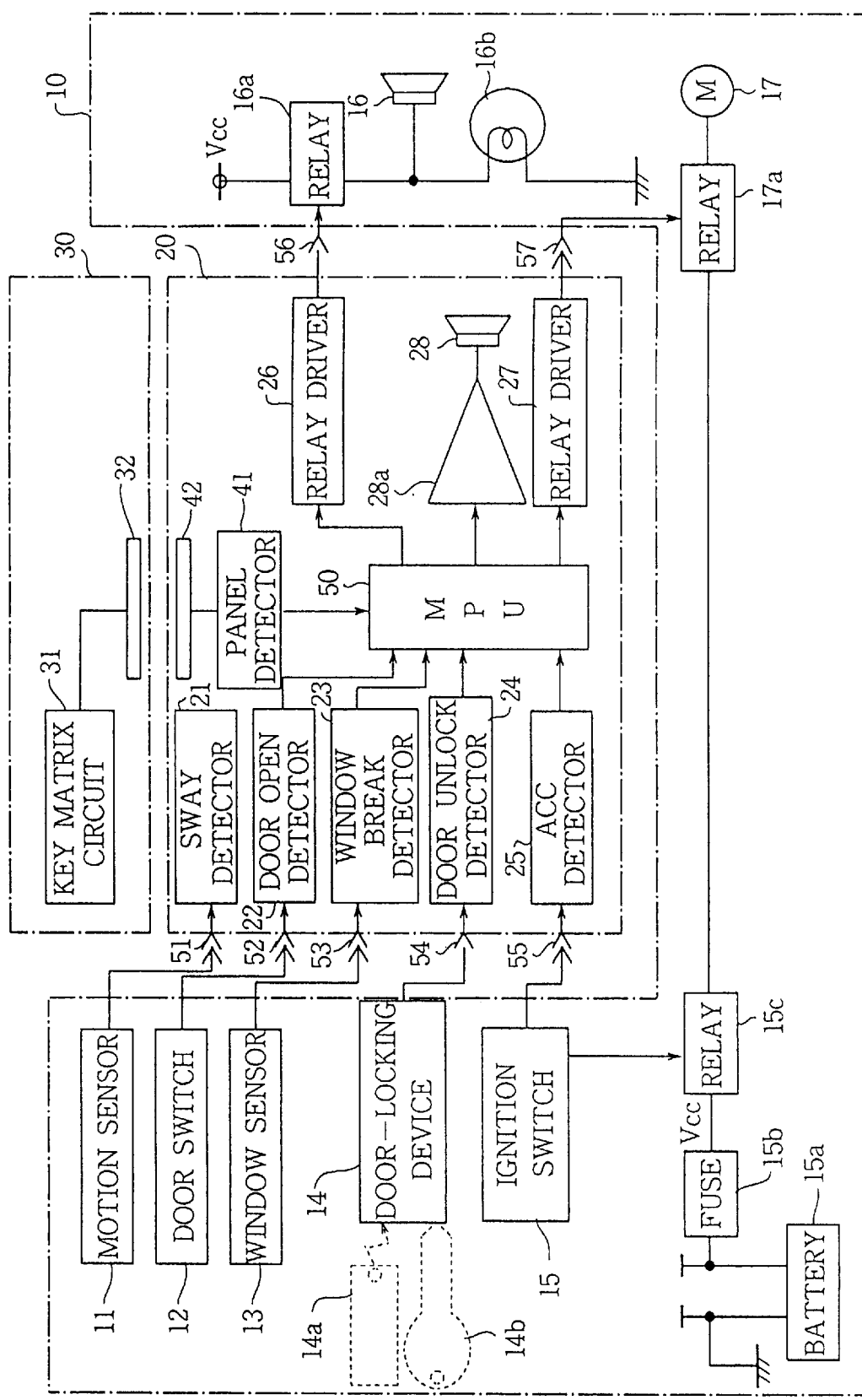
FIG. 2 is a block diagram of an antitheft alarm system of the present invention.

Referring to FIG. 2, in the removable panel 30, an antitheft alarm system according to the present invention comprises the key matrix circuit 31 operated by various keys, and the connector 32 connected to the matrix circuit 31. When the panel 30 is attached to the body 20, the connector 32 is connected to the connector 42 of the body 20 so as to render the car stereo operative.

The electric circuit 10 in the car is provided with various sensors and switches for detecting the conditions of the car. Namely there are provided a motion sensor 11 for detecting a swaying of the car when shaken by an offender, a door switch 12 for detecting the opening of the door, and a window sensor 13 for detecting the breaking of the window. The electric circuit 10 is further provided with a master-controlled door-locking device 14 which is operated by a remote controller key 14a or by an ignition key 14b to simultaneously lock and unlock all of the doors of the car. The door-locking device 14 generates a door lock signal when the doors are locked. An ignition switch 15 which is operated by the ignition key (ACC) 14b and generates a key position signal is further provided.

The antitheft alarm system provided in the body 20 comprises an MPU 50 which executes various programs to control audio signals of the car stereo and to control the alarm system. The MPU 50 is connected to various detectors 21 to 25, each connected to sensors and switches 11 to 15 of the electric circuit 10.

More particularly, there is provided a sway detector 21 for determining that the car is shaken in accordance with a signal from the motion sensor 11 applied through the pin jack 51. The sway detector 21 is provided with an A/D converter and other devices so as to determine not only that the car is swaying, but also the degree of the sway. A door open detector 22 and a window break detector 23 are connected to the door switch 12 and the window sensor 13 through the pin jacks 52 and 53, respectively. A door unlock detector 24 is fed with the door lock signal from the door-locking device through the pin jack 54 and an accessory position detector 25 detects that the ignition switch 15 is in the accessory position in accordance with the key position signal fed through the pin jack 55. A panel detector 41 is further provided to detect that the removable panel 30 is electrically connected to the body 20. The output signals of these detectors 21 to 25 and 41 are fed to the MPU 50. The MPU 50 produces an alarm signal and a starting motor cut off signal in accordance with the conditions of the car. Although not shown in the figure, the detectors 21 to 25 are provided with latch circuits for holding a signal data, filter circuits, each appropriate for signals fed from the respective sensors, and address decoders for allowing the access by the MPU 50.

The MPU 50 is connected to a loudspeaker 28 of the car stereo through an amplifier 28a. During the normal operation, the speaker 28 emits an audio output of the car stereo. However, during the operation of the alarm system, the speaker 28 is adapted to emit an alarm in accordance with the alarm signal from the MPU 50. The MPU 50 is further connected to a horn 16 and hazard flashers 16b through a relay driver 26, pin jack 56 and a relay 16a. When applied with the alarm signal, the relay driver 26 operates the relay 16a thereby sounding the horn 16 and operating the hazard flashers 16b.

In addition, the MPU 50 is connected to a starting motor 17 through the pin jack 57 and a relay 17a actuated by a relay driver 27. The relay 17a is connected to a battery 15a though a fuse 15b and a relay 15c which is actuated by the operation of the ignition switch 15. When the ignition key 14b is turned to the engine starting position, the relay 15c is operated. If the relay 17a is operated, the power of the battery 15a is supplied to the starting motor 17 thereby to drive it. However, when the starting motor cut off signal is generated at the MPU 50, the relay 17a stays inoperative, thereby preventing the operation of the motor 17. Thus the car cannot be started.

In normal operation, the MPU 50 is in the audio mode wherein audio signals and other signals for operating the car stereo are controlled. In the alarm mode, the MPU 50 executes various programs to carry out an alarm set control wherein the car stereo is set in the alarm mode for preventing the theft of the car, a monitor control wherein abnormalities implying an attempt at the theft are monitored in accordance with the detected conditions of the car, an alarm control wherein the alarm is activated when the abnormalities occur, and an alarm release control wherein the alarm mode is released. The detailed operations of the MPU 50 will now be described with reference to flowcharts shown in FIGS. 3 to 12.

Figure 3:
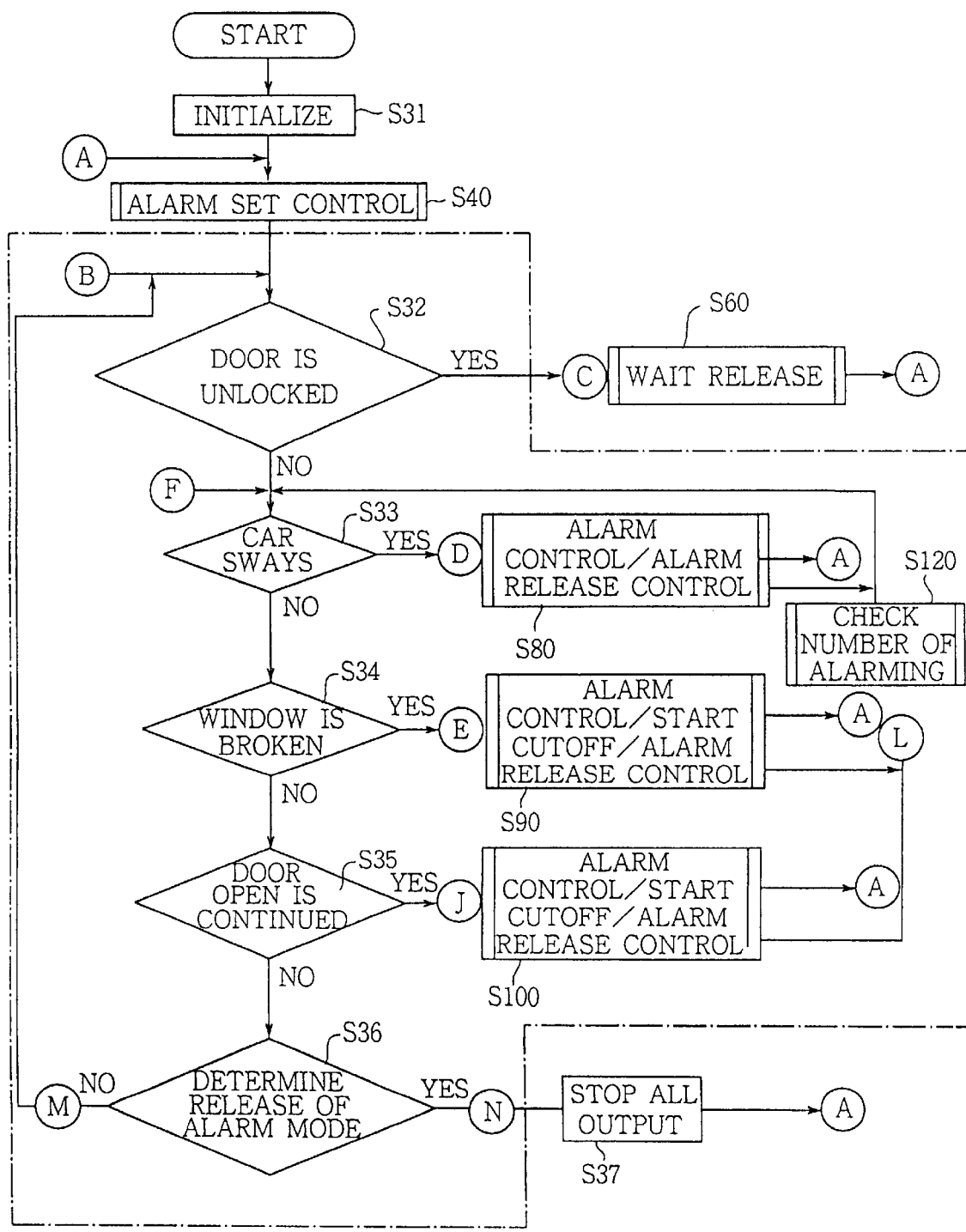
FIG. 3 is a flowchart describing the overall operation of the antitheft alarm system.

Referring to FIG. 3 explaining the overall operation of the alarm system, in the alarm mode, at a step S31, the alarm system is initialized. Various conditions for operating the programs, such as a period of time for releasing the alarm mode before activating the alarm, are set to the preference of the user. The setting operation is described in detail in the specification of the afore-mentioned Japanese Patent Application 7-168019.

Figure 4:
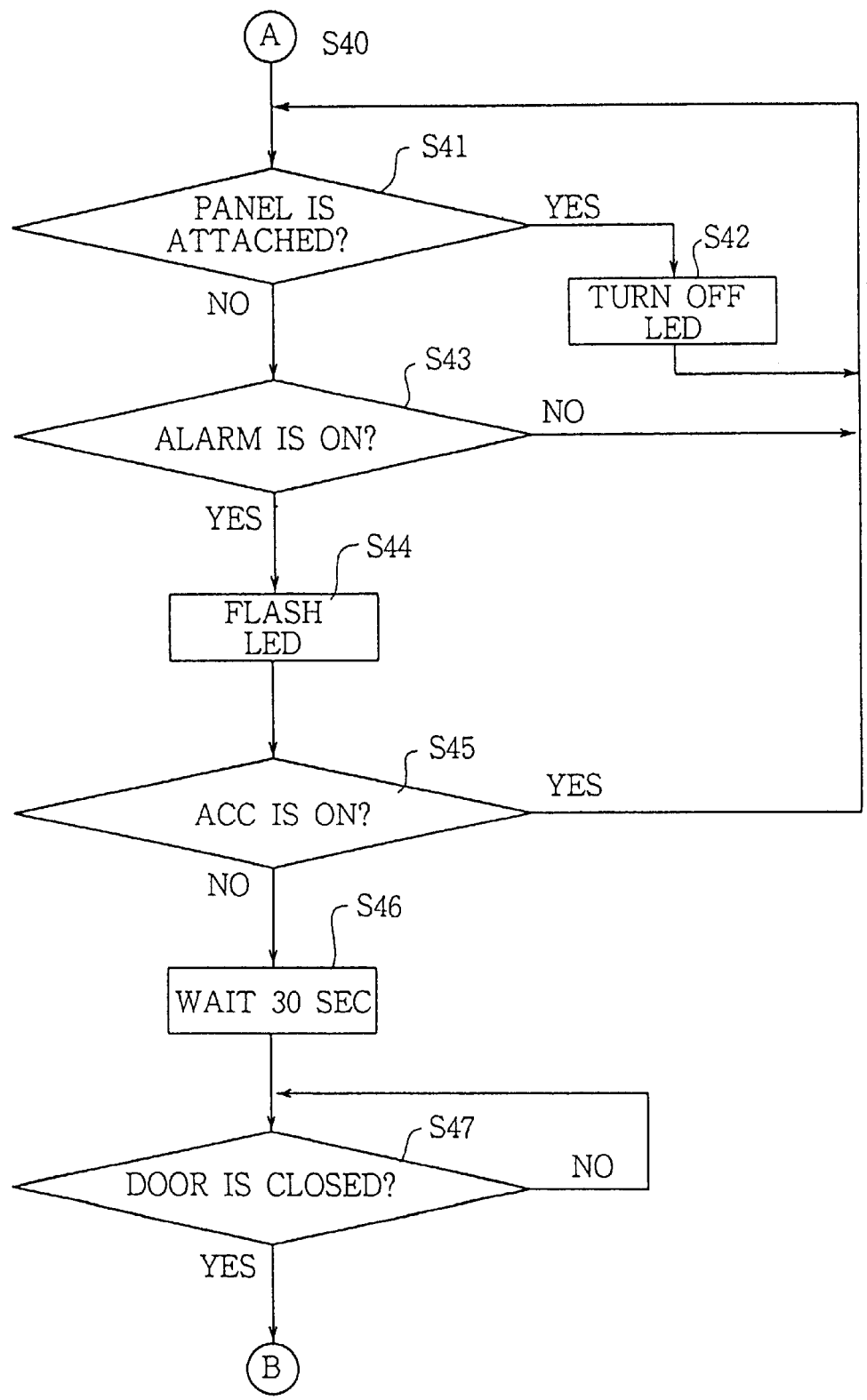
FIG. 4 is a flowchart describing an alarm set control operation for setting an alarm mode.

After an audio mode flag is set, the alarm set control mode is carried out at a step S40 to determine that the audio mode is released and the alarm mode is set. FIG. 4 describes the operation of the alarm set control in detail.

Referring to FIG. 4, when leaving the car, the driver removes the panel 30 from the car stereo body 20 to take the panel with him. When the MPU 50 (FIG. 2) determines at the step S41 that the panel 30 is attached to the body 20, an LED (not shown) which is provided on the front surface of the car stereo body 20 for warning the driver, the operation of which will be described later in detail, is turned off at a step S42. The program thereafter repeats the steps S41 and S42, maintaining the audio mode.

When it is detected that the panel 30 is detached at the step S41, and determined at a step S43 that the alarm is turned on at initialization at the step S31, the LED starts to flash at a step S44. At a step S45, it is determined that the ignition switch 15 is turned off. After waiting a predetermined delay period such as thirty seconds at a step S46, the alarm operation is prepared. The predetermined period set at the step S46 is the period of time during which the driver is expected to open the door and get out of the car. When the delay period is over, the driver is out of the car and the door is closed. After determining at a step S47 that the door is closed, an alarm mode flag is set. The alarm mode is thus set only after the driver is out of the car so that the driver need not hastily get out of the car.

Referring back to FIG. 3, the program proceeds to a step S32, thereby starting the monitor control. During the monitor control, while the door is kept locked (step S32), abnormalities such as the swaying of the car, breaking of the window and the opening of the door for more than a predetermined period are monitored at steps S33, S34 and S35, respectively. A loop comprising the steps S33 to S35 is repeated when none of the abnormalities occur. If the door is legitimately unlocked by the legitimate driver of the car during the monitor control, the program proceeds from the step S32 to a step S60, which is shown in detail in FIG. 6, thereby to determine the release of the alarm mode.

Figure 6:
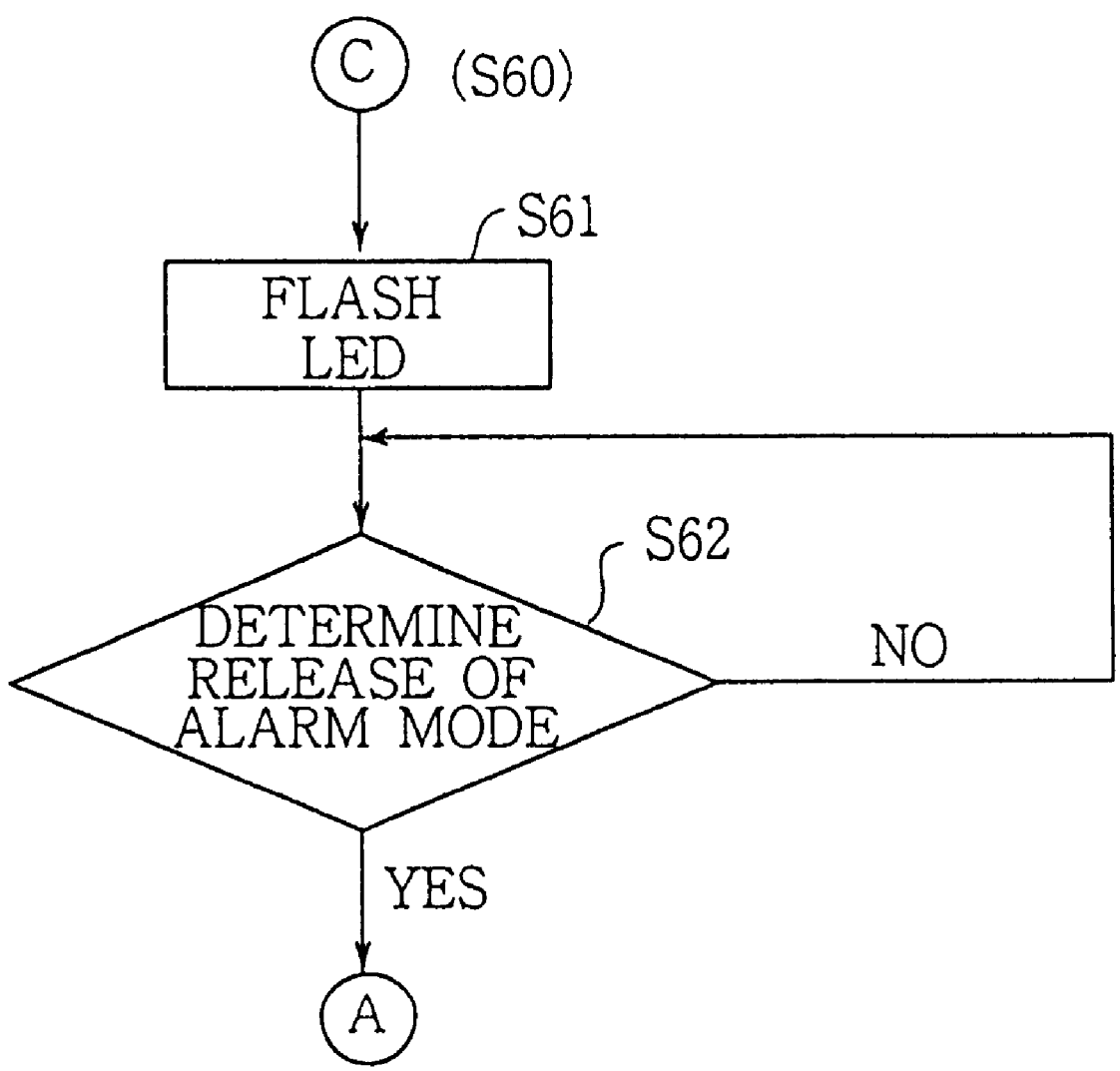
FIG. 6 is a flowchart describing the operation for determining the release of the alarm mode.

Referring to FIG. 6, at a step S61, the LED mounted on the body 20 is flashed. Thereafter at a step 62, it is determined whether to released the alarm mode. The alarm release control at the step S62 is described in detail in FIG. 7.

Upon return to the car, the driver attaches the panel 30 to the body 20 of the car stereo. Hence the program returns from a step S71 of FIG. 7 to the main loop of FIG. 3 so that the audio mode flag is set again to resume the audio mode until the alarm mode is set the next time. If the driver forgets to bring back the panel 30 with him, the program proceeds to a step S72 where it is determined whether an ignition key flag IGKEY is set during the initialization at the step S31. The driver, in order to release the alarm mode without attaching the panel 30, either turns the ignition key to the accessory position once or five times. Namely, if the IGKEY flag is set, the ignition key is turned once at a step S73. If the IGKEY flag is reset, the ignition key is turned on five times within one minute at a step S74. Hence the program returns to the main loop so that the alarm mode is released. On the other hand, an intruder may unlock the door with a stolen key and enter the car. Since he does not have the panel 30, and does not have a knowledge of measures for releasing the mode, the alarm mode is maintained.

When any of the abnormalities occur, the program goes from the steps S33, S34 and S35 to steps S80, S90 and S100, respectively, thereby to effectuate the alarm control.

Figure 5:
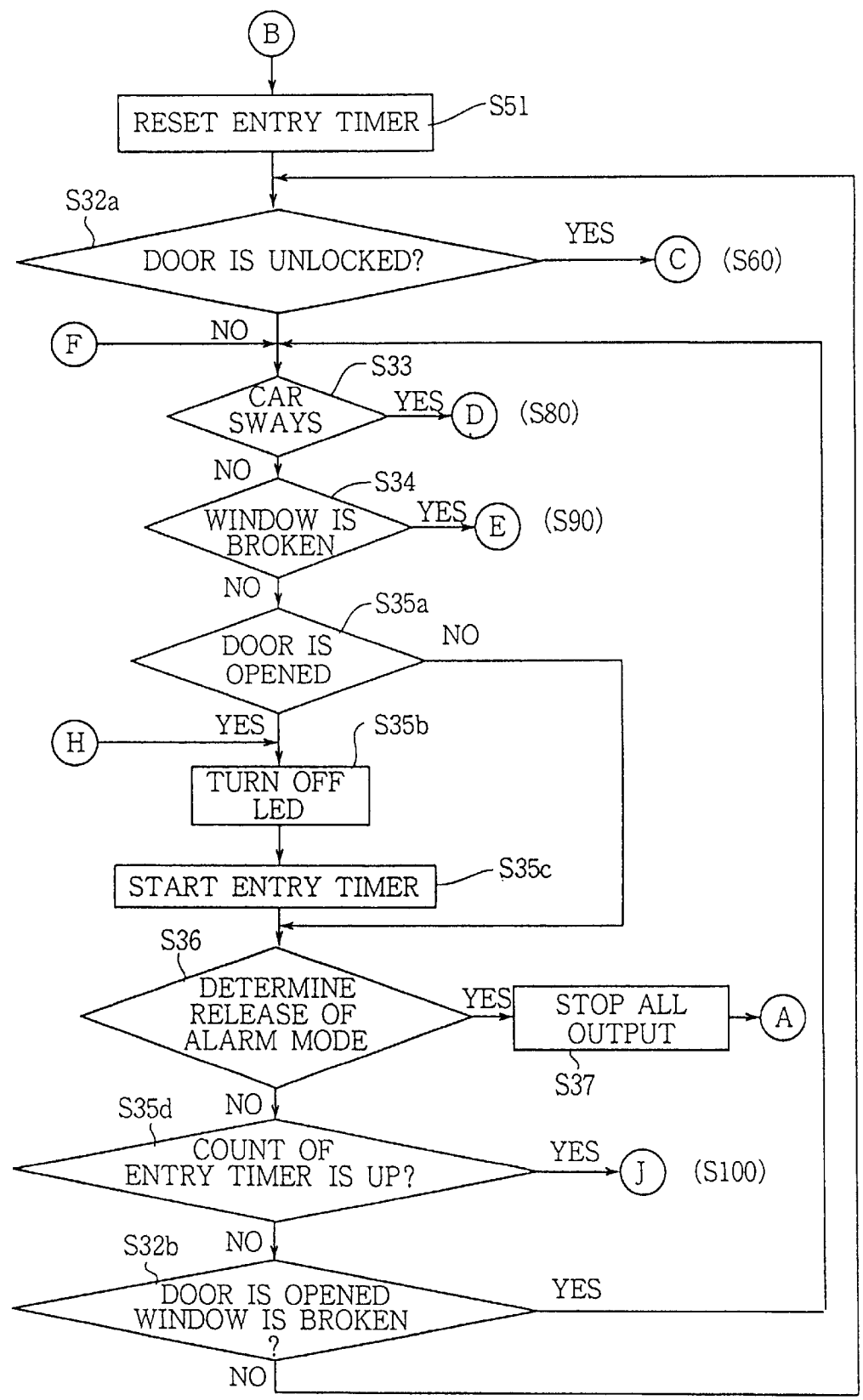
FIG. 5 is a flowchart describing monitor control operation during the alarm mode.

FIG. 5 shows the monitor control operation of the alarm mode in detail. At a step S51, an entry timer, which is set when the door of the car is opened, is reset. At a step S32*a*, which corresponds to the step S32 in FIG. 3, it is determined whether the master-controlled door-locking device is unlocked, that is, by the legitimate user of the car. If the door is kept locked, the program goes to the step S33 where the swaying of the car is detected. When the car is shaken by an offender, causing the car to sway, the program goes to the step S80 which is shown in FIG. 8 for the alarm control and the alarm release control.

Figure 7:
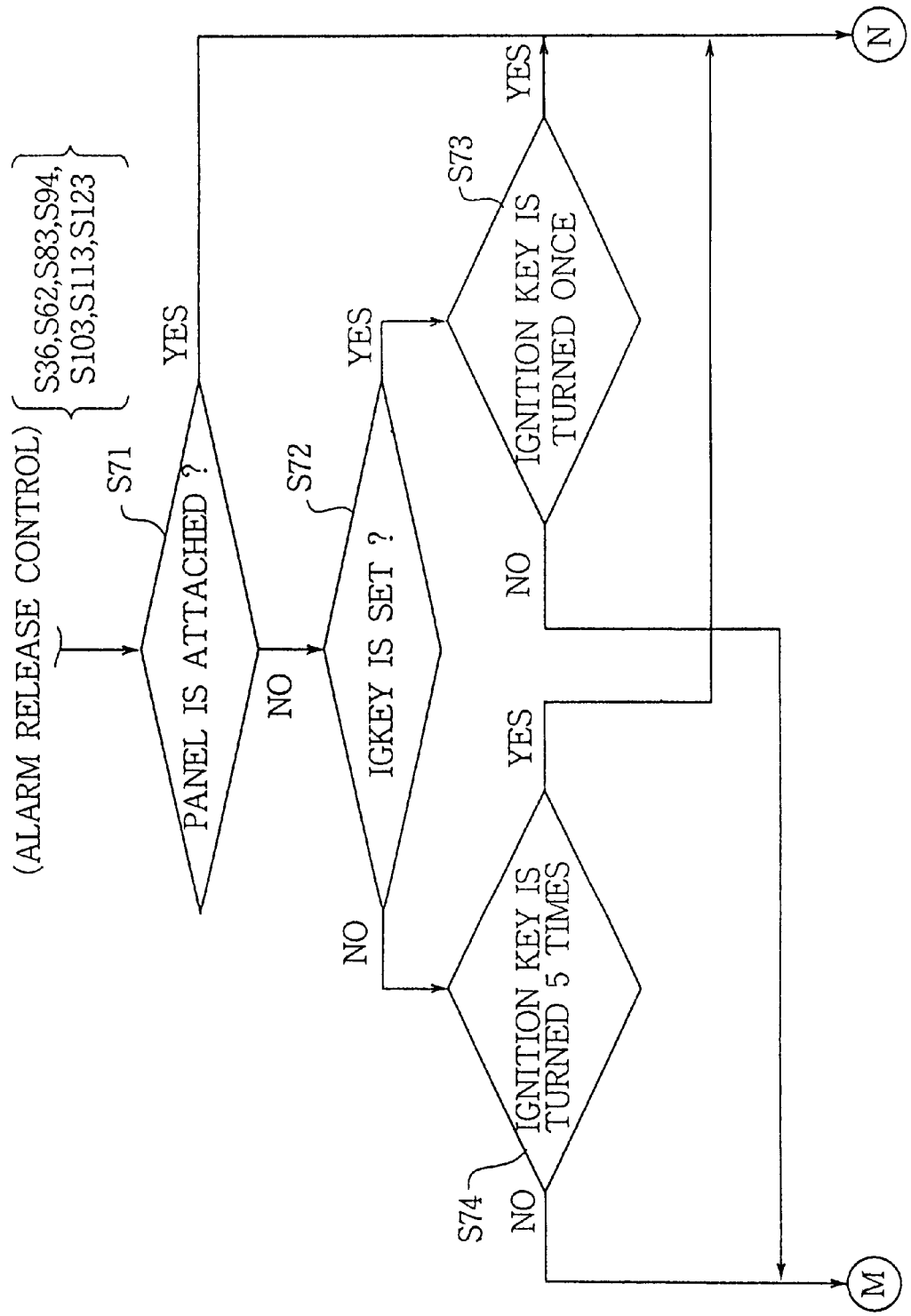
FIG. 7 is a flowchart describing an alarm release control for releasing the alarm mode.
Figure 8:
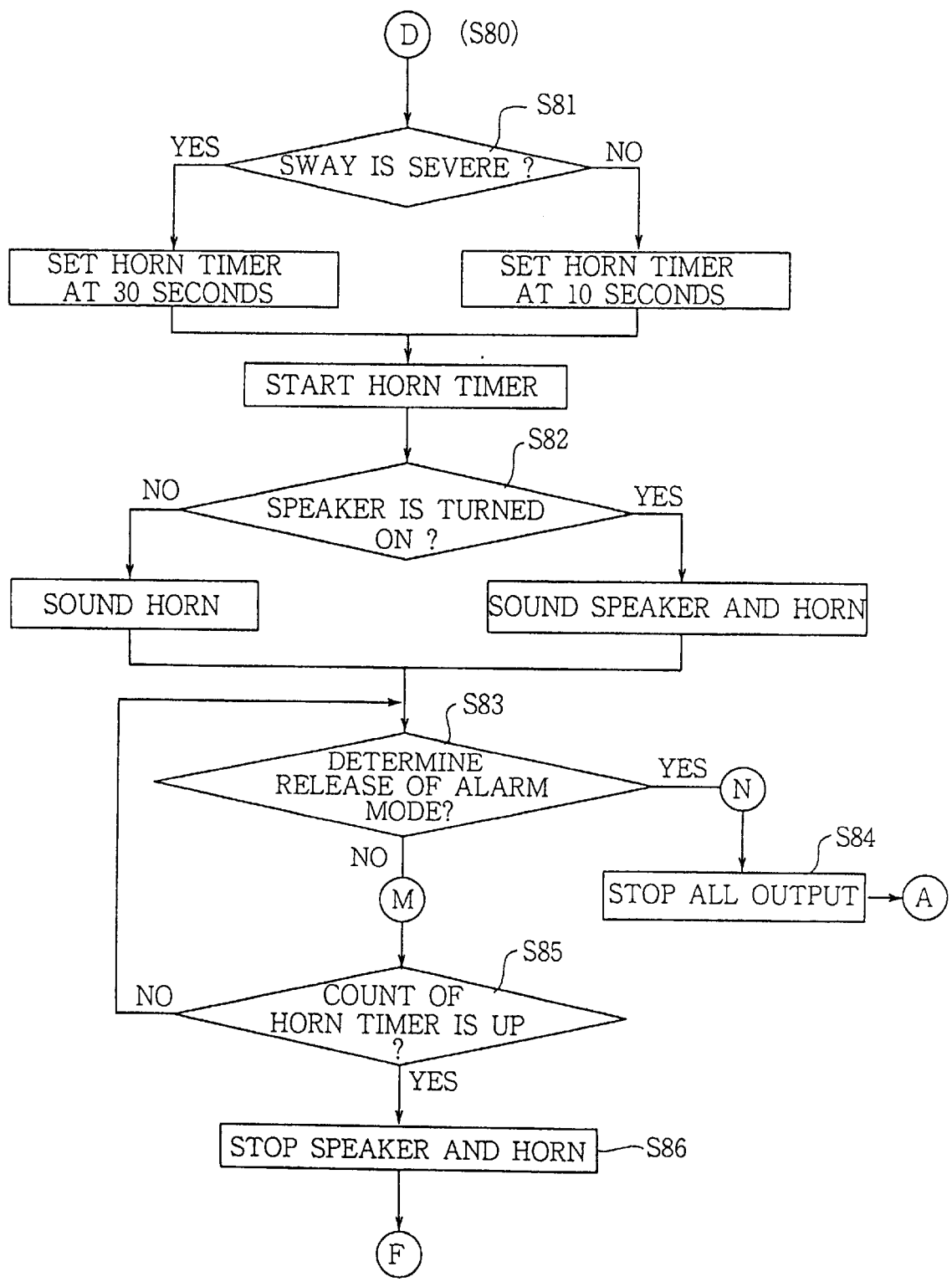
FIG. 8 is a flowchart describing the operation executed when a car is shaken during the monitor control operation.

Referring to FIG. 8, the degree of the sway of the car is detected at a step S81. If the sway is severe, a horn timer is set to thirty seconds. On the other hand, when the sway is moderate, the horn timer is set to ten seconds. After the timer is started in either case, at a step S82, it is determined whether the speaker 28 is set to be operated at the initialization. If the speaker is set not to operate, only the horn 16 is activated. Namely, the MPU 50 applies the alarm signal to the relay 16*a* thereby operating the horn 16. If the operation of the speaker is selected, the alarm signal is also fed to the speaker 28 through the amplifier 28*a*. The offender, warned by the alarm, leaves the car. Thereafter, the program proceeds to a step S83 where the alarm release control is executed as described hereinbefore with reference to FIG. 7.

When the legitimate driver of the car returns to the car while the alarm is still sounded, he releases the alarm mode by attaching the panel 30 or by operating the ignition key 14*b*. Hence the program goes to a step S84 where output of all of signals from the MPU 50 is stopped. The loudspeaker 28 and the horn 16 hence stop sounding. The program returns to the main loop to resume the audio mode.

If the alarm mode is not released at the step S83, it is detected at a step 85 that the set time, which is ten seconds for the moderate swaying and thirty seconds for severe swaying, elapsed. When the set time has elapsed, the alarm from both the loudspeaker 28 and the horn 16 is stopped. The monitor control is thereafter continued.

Figure 9:
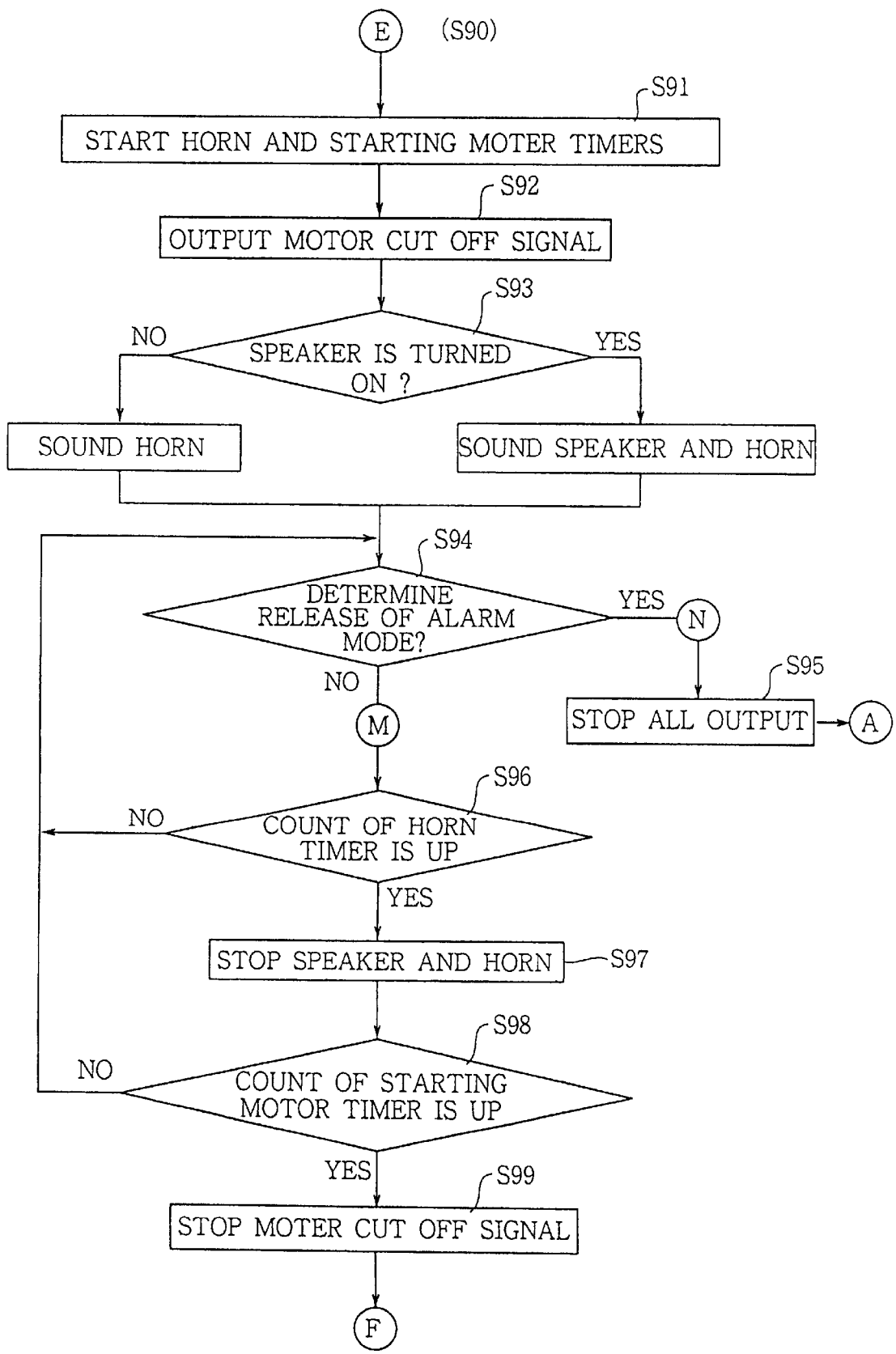
FIG. 9 is a flowchart describing the operation executed when a window of the car is broken during the monitor control operation.

Referring back to FIG. 5, when it is detected that the window of the car is broken by an offender at the step S90, the program shown in FIG. 9 is started. At a step S91, the horn timer and a starting motor timer are started. The starting motor timer is for counting the timer during which the operation of the starting motor 17 is prevented. At a step S92, the MPU 50 starts to apply the stating motor cut off signal to the relay driver 27, thereby rendering the relay 17*a* inoperative. Hence the starting motor 17 cannot be driven although the ignition switch may be turned on by the offender. Although the offender may break the ignition switch and connect the starting motor 17 with the battery 15*a*, the car cannot be started. Hence it becomes difficult for the offender to steal the car.

Since the alarm is activated as soon as an attack on the car such as the breaking of the window and shaking is started, the car is protected from further assault. Even though the offender breaks the window in attempt to steal the car stereo and other items in the car, the alarm stops him from entering the car.

At a step S93, it is detected whether the loudspeaker is turned on at the initialization and the horn 16 and the loudspeaker 28, or only the horn are sounded accordingly. When the driver returns to the car, the release of the alarm mode is determined at a step S94 as shown in FIG. 7 and the alarm signal and the motor cut off signal from the MPU 50 is stopped at a step S95. The audio mode is thus resumed.

If the alarm mode is not released at the step S94, the horn and the speaker keeps on sounding the alarm until it is determined at a step S96 that the time set by the horn timer, for example thirty seconds, has elapsed. Accordingly, the horn and the loudspeaker stop the alarm at a step S97. When it is determined at a step S98 that a time set by the starting motor timer, for example, thirty minutes has elapsed, the MPU 50 stops applying the starting motor cut off signal to the relay driver 27. Thereafter, the monitor control is continued.

When it is detected at a step S35a of FIG. 5, or the step S35 of FIG. 3 that the door is opened either by the legitimate driver or by an intruder, the LED on the car stereo body is turned off at a step S35b shown in FIG. 5. The entry timer is then started at a step S35c. The entry timer is set to a period of time longer than the time it usually takes a legitimate owner of the car to open the door with a key and execute the alarm release operation. If the release of the alarm mode is determined at a step S36 in accordance with the operation described in FIG. 7, the MPU 50 stops generating output signals. When the alarm mode is not released during the time set by the entry timer, the program goes from a step S35d to a step S32b where it is determined whether the door is opened or the window is broken. If these abnormalities do not occur, the program returns to the step S32a.

Figure 10:
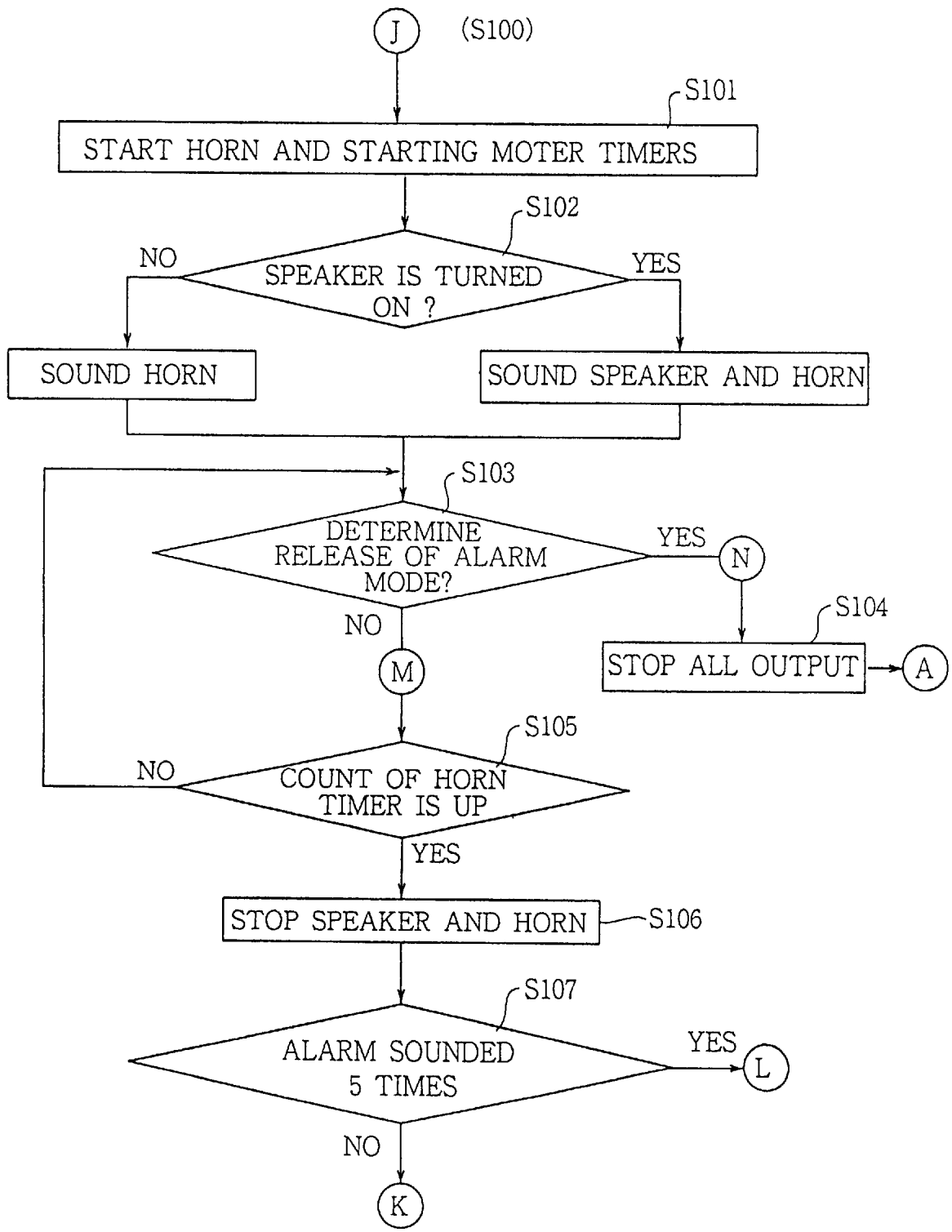
FIGS. 10 to 12 show a flowchart describing the operation executed when a door of the car is opened during the monitor control operation.
Figure 11:
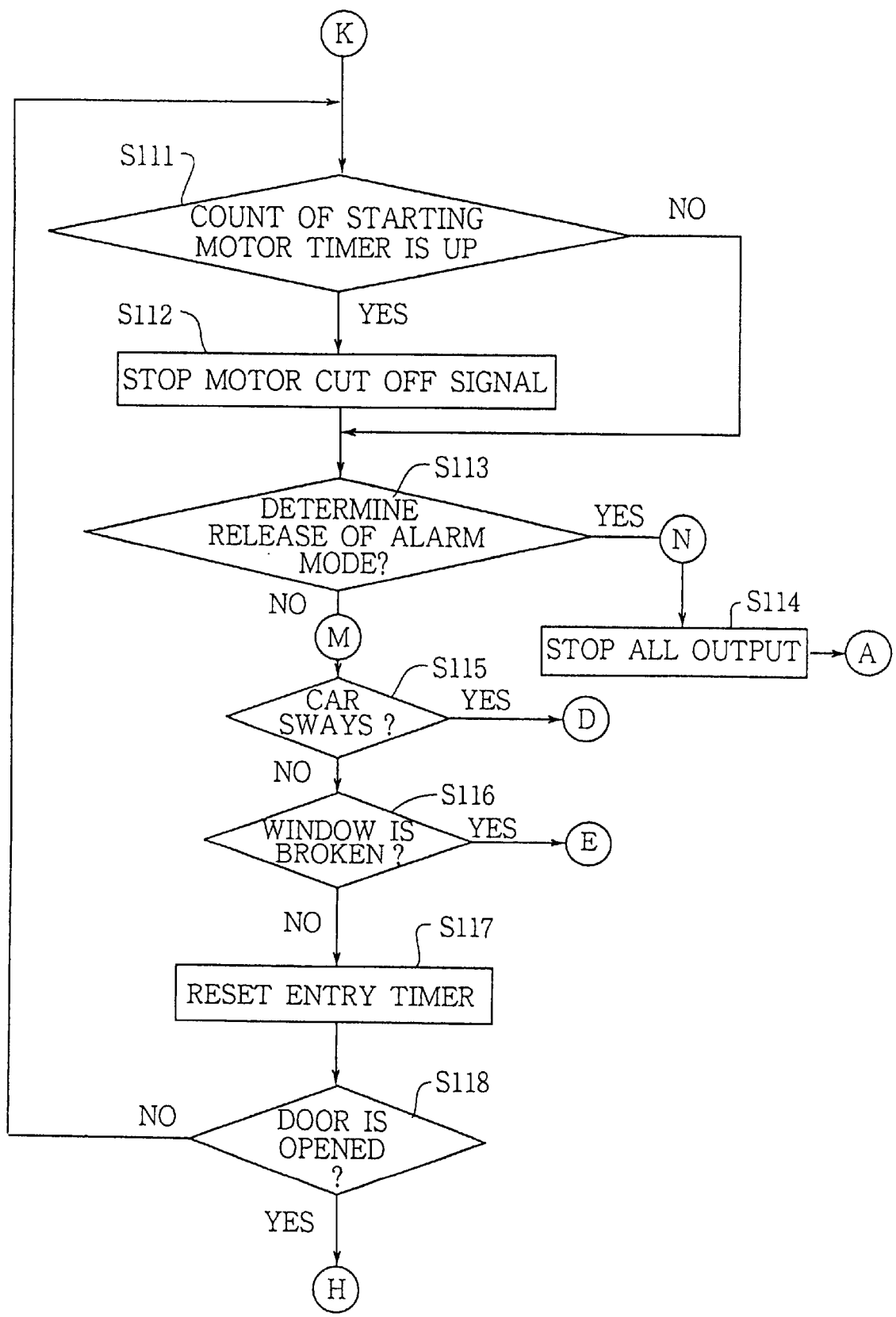

If the predetermined time elapses without releasing the alarm mode, the program goes from the step S35d to the step S100, which is described in FIGS. 10 and 11.

At the step S100, the similar operation as at the step S90 in FIG. 9 is started. Namely, the horn timer and the starting motor timer are started at a step 101. The horn, or the speaker and the horn depending on the decision at a step S102, are sounded and the starting motor cut off signal is generated for respective periods of time. The legitimate driver can release the alarm mode at a step S103 and stop all the output signals of the alarm mode at a step S104. On the contrary, an intruder cannot release the alarm mode so that the horn and the speaker will go on sounding until the set time of thirty seconds is up at a step S105. Hence the alarm is stopped at a step S106.

Figure 12:
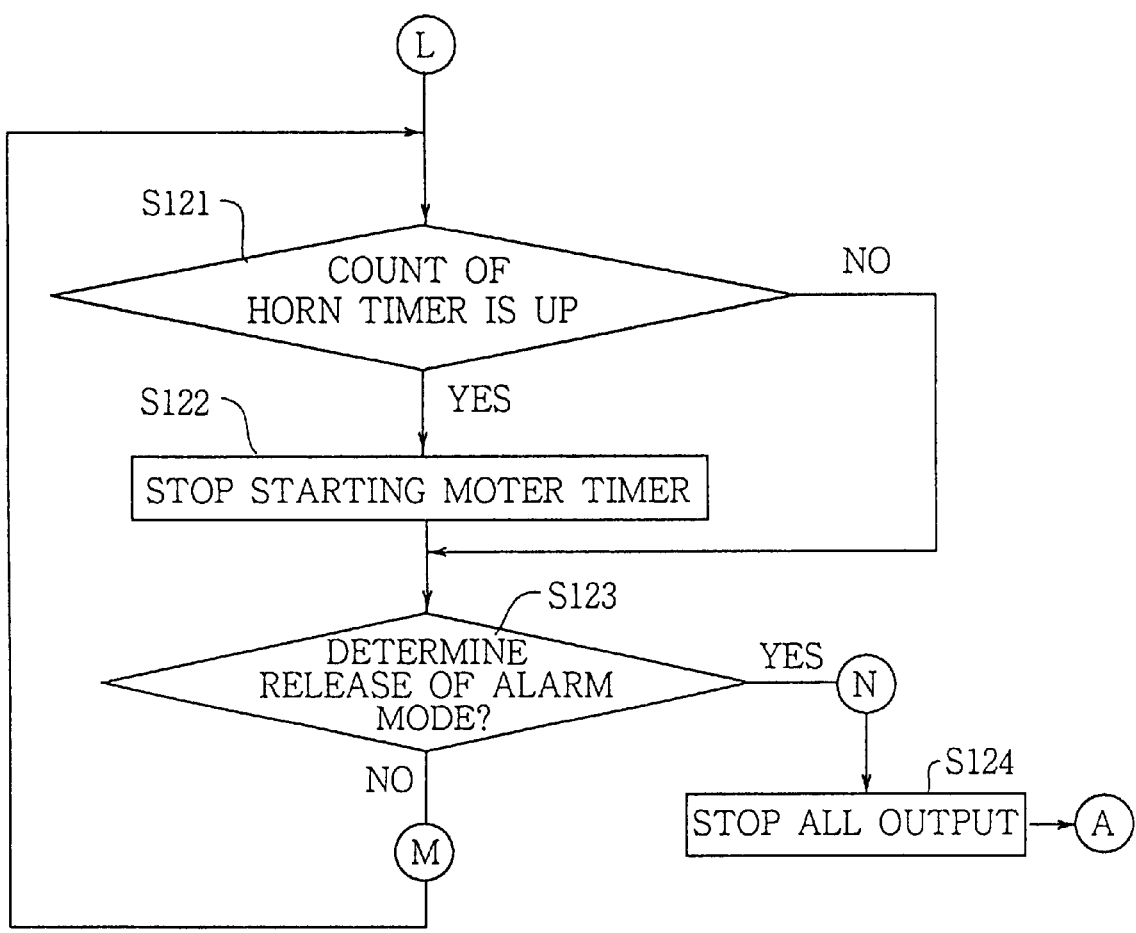

During the operation, the number of the alarm sounded due to the breaking of the window and the opening of the door is counted. When the count exceeds five times (step S107), the program goes to a step S120 (FIG. 3). The MPU stops applying the alarm signal and the starting motor cut off signal so that the complete discharging of the battery 15a is prevented. Namely, as shown in FIG. 12, the alarm is stopped. The limit of the alarming times is determined in accordance with the capacity of the battery 15a.

If the alarm is activated less than five times, the program goes to a step S111 of FIG. 11. When the time set by the starting motor cut off timer has elapsed, the output of the starting motor cut off signal is stopped at a step S112. When it is within the time, the program jumps to a step S113 where the legitimate driver may release the alarm mode although the alarm is already sounded. Hence the MPU 50 stops generating the output signals at a step S114 and the audio mode is resumed.

While the operation of the starting motor is stopped, the intruder might further shake the car or break the window. Hence the program goes from a step S115 to the step S80 described in FIG. 8, or from a step S116 to the step S90 described in FIG. 9, thereby again sounding the alarm through the horn 16 and the loudspeaker 28. If none of these abnormalities occur, the entry timer is reset at a S117. If the door is again opened at a step S118, the program goes to the step S35b of the monitor control shown in FIG. 5. The loop of the steps S111 to S117 is repeated when no further abnormality occurs.

An example of the operation of the system is described hereinafter.

The legitimate driver of the car, when leaving the car turns the ignition key 14b to turn off the ignition switch 15 and pulls out the key. He further detaches the panel 30 from the body 20 of the car stereo to take it with him. The driver then gets off the car and closes the door. After thirty seconds after the closing of the door, the monitor control of the alarm mode is started. The driver locks the master-controlled lock device to lock the door and leaves the car.

The driver may return to the car while nothing abnormal occurs to the car. He then unlocks the door with the remote controller key 14a so that the monitoring control is stopped and the alarm release control is started. Hence the driver need not hastily carry out the releasing operation for fear of starting the alarm. The driver can attach the panel 30 to the body 20 with ease to return the operation of the car stereo to the audio mode. Thereafter the engine can be started to drive the car.

The driver may forget to bring the panel 30 or may get off the car after only a short while. In order to prevent the alarm, the ignition key is turned to the accessory position a predetermined number of times.

If an abnormality such as the breaking of the window occurs before the driver comes back, the horn 16, or in addition to the horn, the loudspeaker 28, sounds an alarm. The number of the alarming times is restricted so that the battery 15a is prevented from becoming completely discharged. In addition, the operation of the starting motor 17 is stopped for thirty minutes. The monitor control is continued although the door is unlocked. Hence an intruder cannot stop the alarm by simply operating a lock release button provided in the car, so that he will leave the car without stealing. The alarm is sounded in the same manner when the door is opened by force, or an attempt to smash the car is made.

On the other hand, the legitimate user has the panel 30 which is attached to the body 20 of the car stereo, or the ignition key 14b which is turned to operate the ignition switch 14. Hence the alarm mode can be released and the starting motor can be driven.

From the foregoing it will be understood that the present invention provides an antitheft alarm system of a car, wherein the alarm mode can be easily released by the legitimate driver of the car by unlocking the door of the car with the key. When once a theft and other criminal act is attempted and the alarm is activated, the alarm cannot be stopped just by unlocking the door and requires further operations capable only by the legitimate driver. Thus the theft of the car becomes difficult to the offender.

While the invention has been described in conjunction with preferred specific embodiment thereof, it will be understood that this description is intended to illustrate and not limit the scope of the invention, which is defined by the following claims.

What is claimed is:

1. A car stereo which is mounted on a vehicle, the car stereo having a body, a removable panel attached to the body, and a plurality of operation buttons for operating the car stereo, the car stereo comprising:

a detection signal input portion for receiving a criminal act signal from a criminal act sensor provided on the vehicle for producing a criminal act signal;

an alarm signal generator for generating an alarm signal in response to the criminal act signal;

setting means for setting an alarm mode for effecting the alarm signal generator;

panel detecting means for detecting whether the removable panel is being attached to the body and for producing a releasing signal; and releasing means responsive to the releasing signal for releasing the alarm mode.

2. The car stereo according to claim 1, wherein the detection signal input portion is connected to a window sensor provided on a window of the vehicle, and wherein the criminal act signal indicates the window has been broken.

3. The car stereo according to claim 1, wherein the detection signal input portion is connected to a motion sensor mounted on the vehicle, and wherein the criminal act signal indicates sway of the vehicle.

4. The car stereo according to claim 3, wherein the alarm signal generator stops generating the alarm signal after a predetermined time from starting of the generation of the alarm signal.

5. The car stereo according to claim 4, wherein the predetermined time varies in accordance with the criminal act signal.

6. The car stereo according to claim 1, wherein the alarm signal is provided for operating a horn of the vehicle.

7. The car stereo according to claim 1, wherein the alarm signal is provided for operating a speaker mounted on the vehicle.

8. The car stereo according to claim 1, wherein the alarm signal generator stops generating the alarm signal after a predetermined time from starting of the generation of the alarm signal.

9. The car stereo according to claim 1, wherein the releasing means releases the alarm mode when the number of the generation of the alarm signal exceeds a predetermined number.

10. An antitheft system for a car having a car stereo which is mounted on a vehicle, the car stereo having a body, a removable panel attached to the body, having a plurality of operation buttons for operating the car stereo, the system comprising:

a criminal act sensor provided on the vehicle for producing a criminal act signal;

an alarm signal generator for generating an alarm signal in response to the criminal act signal;

setting means for setting an alarm mode for effecting the alarm signal generator;

panel detecting means for detecting whether the removable panel is being attached to the body and for producing a releasing signal; and releasing means responsive to the releasing signal for releasing the alarm mode.

11. The system according to claim 10, wherein the criminal act sensor is a window sensor provided on a window of the vehicle, and wherein the criminal act signal indicates the window has been broken.

12. The system according to claim 10, wherein the criminal act sensor is a motion sensor mounted on the vehicle, and wherein the criminal act signal indicates sway of the vehicle.

13. The system according to claim 12, wherein the alarm signal generator stops generating the alarm signal after a predetermined time from starting of the generation of the alarm signal.

14. The system according to claim 13, wherein the predetermined time varies in accordance with the criminal act signal.

15. The system according to claim 10, wherein the alarm signal is provided for operating a horn of the vehicle.

16. The system according to claim 10, wherein the alarm signal is provided for operating a speaker mounted on the vehicle.

17. The system according to claim 10, wherein the alarm signal generator stops generating the alarm signal after a predetermined time from starting of the generation of the alarm signal.

18. The system according to claim 10, wherein the releasing means releases the alarm mode when the number of the generation of the alarm signal exceeds a predetermined number.

* * * * *